(12) United States Patent
Pazhyannur et al.

(10) Patent No.: US 9,480,100 B2
(45) Date of Patent: Oct. 25, 2016

(54) WIRELESS CLIENT DEVICE ROAMING AMONG CLUSTERED ACCESS POINTS

(71) Applicant: Cisco Technology, Inc., San Jose, CA (US)

(72) Inventors: Rajesh Pazhyannur, Fremont, CA (US); Rohit Suri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 14/155,567

(22) Filed: Jan. 15, 2014

(65) Prior Publication Data

US 2015/0201451 A1    Jul. 16, 2015

(51) Int. Cl.
| | |
|---|---|
| H04W 76/04 | (2009.01) |
| H04W 40/00 | (2009.01) |
| H04W 88/18 | (2009.01) |
| H04W 80/04 | (2009.01) |
| H04W 40/36 | (2009.01) |
| H04W 36/00 | (2009.01) |

(52) U.S. Cl.
CPC ........... *H04W 76/041* (2013.01); *H04W 40/00* (2013.01); *H04W 36/0016* (2013.01); *H04W 40/36* (2013.01); *H04W 80/04* (2013.01); *H04W 88/182* (2013.01)

(58) Field of Classification Search
CPC ......... H04W 76/041; H04W 36/0016; H04W 80/04
USPC ........................................................ 370/338
See application file for complete search history.

(56) References Cited

U.S. PATENT DOCUMENTS

| | | | |
|---|---|---|---|
| 7,586,879 B2 | 9/2009 | Chari et al. | |
| 2005/0180358 A1* | 8/2005 | Kolar | H04L 12/4641 370/331 |
| 2006/0198349 A1* | 9/2006 | Ng | H04W 92/24 370/338 |
| 2008/0165735 A1* | 7/2008 | Chen et al. | 370/331 |
| 2008/0171548 A1* | 7/2008 | Tsirtsis et al. | 455/437 |
| 2008/0304485 A1* | 12/2008 | Sinha | H04L 12/66 370/392 |
| 2009/0111458 A1* | 4/2009 | Fox | H04W 84/042 455/422.1 |
| 2012/0320877 A1* | 12/2012 | Li et al. | 370/331 |
| 2013/0343304 A1* | 12/2013 | Kaippallimalil | H04W 28/18 370/329 |
| 2014/0157376 A1* | 6/2014 | Nambiar et al. | 726/5 |

* cited by examiner

*Primary Examiner* — Curtis A Alia
(74) *Attorney, Agent, or Firm* — Edell, Shapiro & Finnan, LLC

(57) ABSTRACT

A controller controls access points (APs) in a network of APs. The controller causes the first AP to establish an Internet Protocol (IP) tunnel with a router connected with a wired network and over which data packets are routed between the wired network and a client device wirelessly connected to the first AP. The controller receives a roam indication that the client device is wirelessly connected with a second AP. In response to the indication, the controller instructs the first AP to maintain the IP tunnel with the router and instructs the second AP to establish an inter-AP tunnel with the first AP in order to route traffic between the wired network and the client device over both the IP tunnel and the inter-AP tunnel.

18 Claims, 8 Drawing Sheets

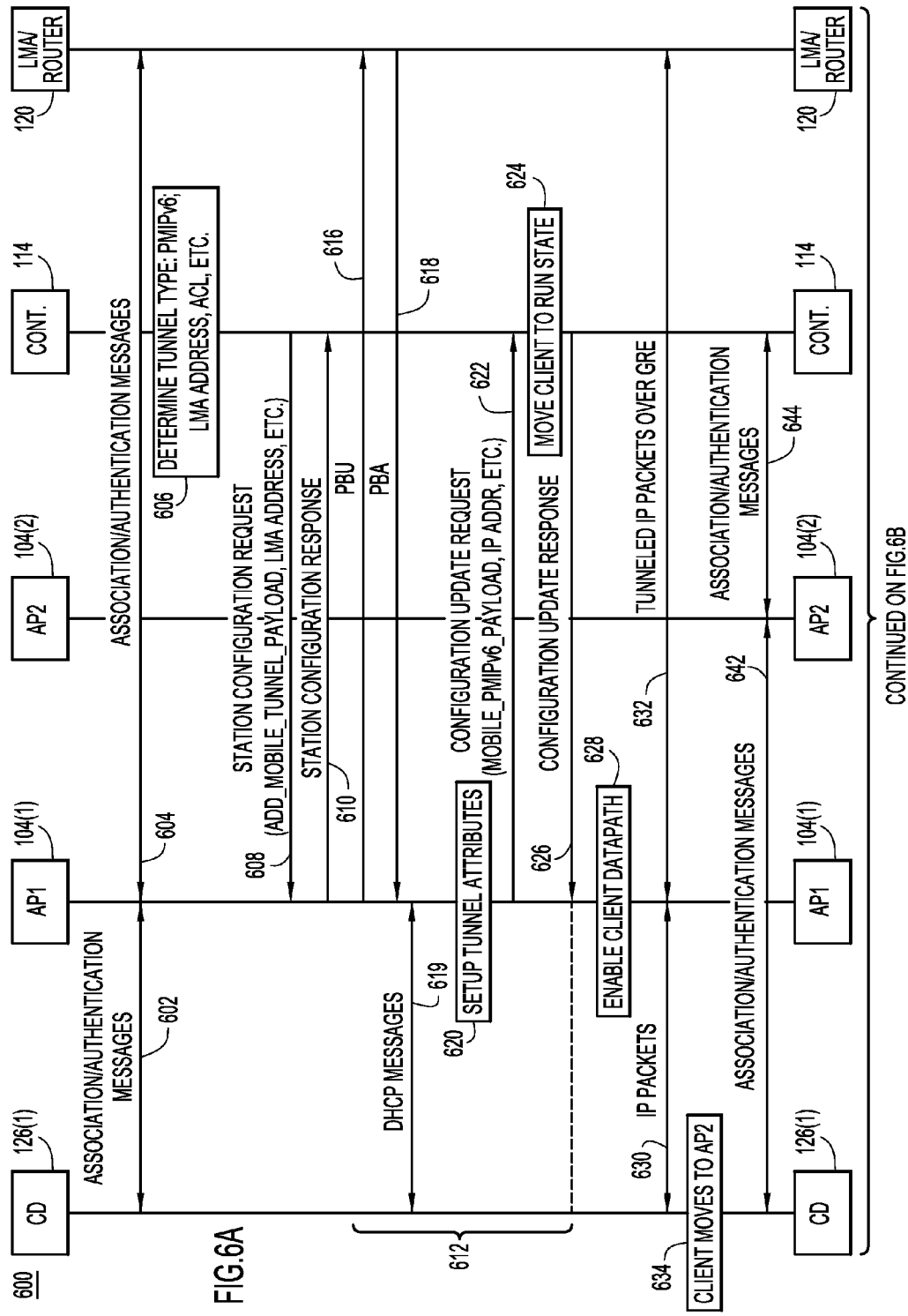

700  CLUSTER DEFINITIONS

| CLUSTER ID | AP ID |
|---|---|
| 1 | 10<br>20<br>30 |
| 2 | 20<br>40<br>60 |

WIRELESS CLIENT DEVICE ROAMING AMONG CLUSTERED ACCESS POINTS

TECHNICAL FIELD

The present disclosure relates to message routing in a network environment where wireless client devices may roam from one wireless local area network access point device to another wireless local area network access point device.

BACKGROUND

A networking environment includes multiple wireless local area network access point (AP) devices (referred to as "APs") and a communication network coupled to the APs. Wireless mobile client devices (CDs) access a router in the communication network through the APs. To this end, Internet Protocol (IP) tunnels are established between the APs and the router in the network to route data packets wirelessly received from the CDs to the router, and to route data packets from the router to the APs for wireless transmission to the CDs. When one of the CDs roams from a first AP to a second AP, roaming-induced signaling messages are exchanged with the router to tear-down a first IP tunnel between the first AP and the router and to setup a second IP tunnel between the second AP and the router.

BRIEF DESCRIPTION OF THE DRAWINGS

FIGS. 6A and 6B collectively represent a detailed ladder diagram showing transactions between the various elements of the network environment of FIG. 1 for handling an intra-cluster roam.

FIG. 7 is an illustration of example AP cluster definitions stored in a memory of a network controller.

DESCRIPTION OF EXAMPLE EMBODIMENTS

Overview

Techniques described herein handle roaming of a wireless mobile client device (CD) between two wireless access point devices (APs) within a predetermined group of APs referred to as an "AP cluster." The techniques also handle roaming of the CD between an AP in the AP cluster and an AP outside of the AP cluster. In accordance with the techniques, a controller is configured to control APs in a wireless network of APs. The controller exchanges signaling messages with a first AP to cause the first AP to establish an Internet Protocol (IP) tunnel between the first AP and a router connected with a wired network and over which data packets are routed between the wired network and a client device wirelessly connected to the first AP. The controller receives a roam indication that the client device is wirelessly connected with a second AP and, in response to the roam indication, (i) instructs the first AP to maintain the IP tunnel with the router, and (ii) instructs the second AP to establish an inter-AP tunnel with the first AP in order to route traffic between the wired network and the client device over both the IP tunnel and the inter-AP tunnel.

Example Embodiments

Figure 1:
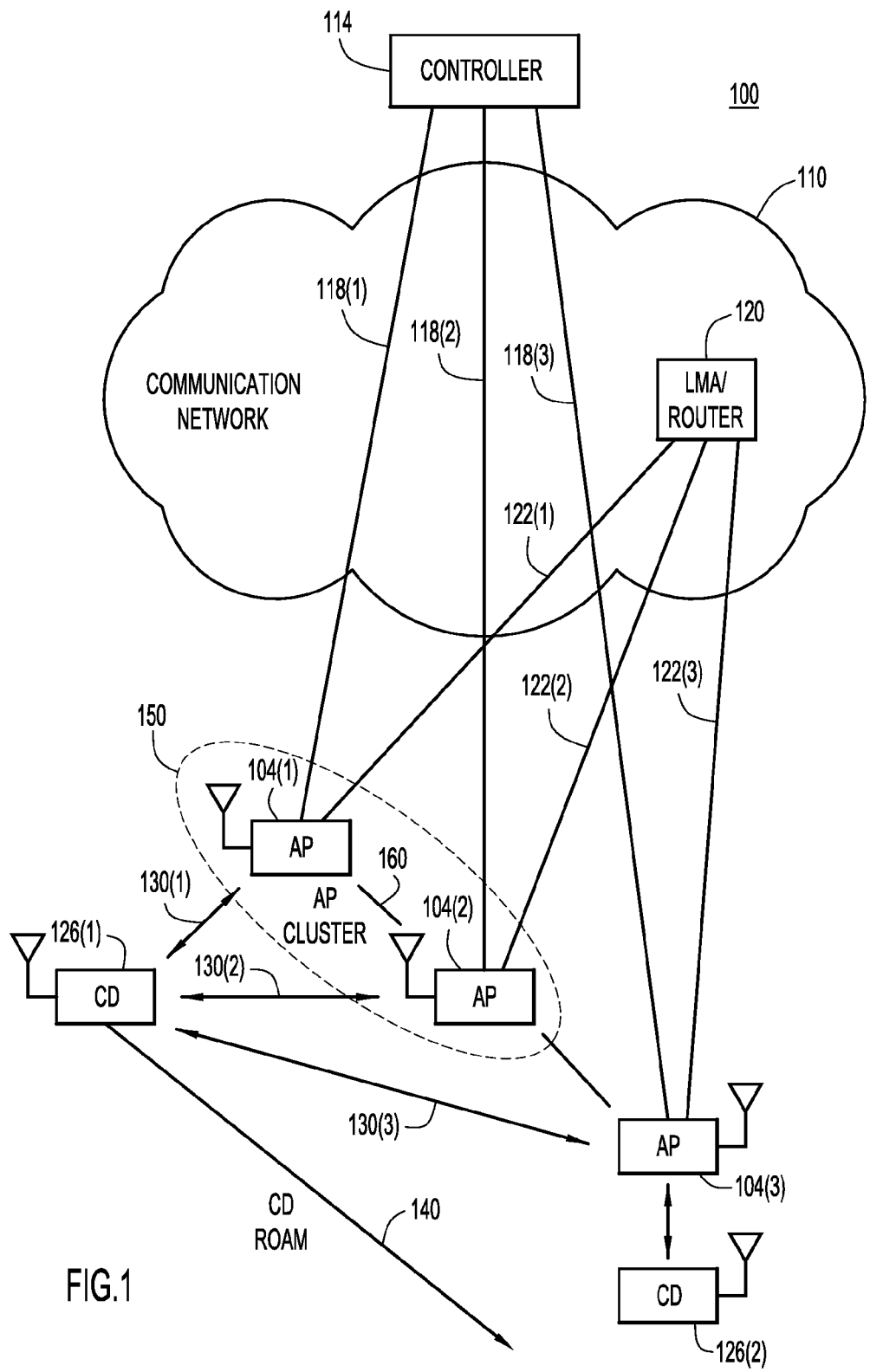
FIG. 1 is a block diagram of a communication network environment in which cluster roaming techniques may be implemented to handle roaming of a wireless mobile client device (CD) between wireless access point devices (APs) that are inside and outside of a cluster of APs.

Reference is first made to FIG. 1 that shows a block diagram of a communication network environment 100 in which the techniques described herein may be implemented. Network environment 100 includes wireless access point (AP) devices 104(1)-104(3) (referred to individually as APs 104(1), 104(2), and 104(3), and collectively as APs 104) and a wired communication network 110, to which the APs are coupled. The wired communication network may include one or more local area networks (LANs) and one or more wide area networks (WANs), such as the Internet. There is a controller 114 coupled to the communication network 110 to control the APs via control and provisioning of wireless access point (CAPWAP) or other Layer2/Layer3 tunnels graphically depicted at reference numerals 118(1)-118(3) (collectively referred to as tunnels 118) established between the controller 114 and the APs 104.

Communication network 110 also includes one or more routers and/or switches 120 to route data packets traffic to/from the APs from/to communication network 110 over Internet Protocol (IP) tunnels 122(1)-122(3) (collectively referred to as IP tunnels 122) between the APs 110 and the router. IP tunnels 122 may be Proxy Mobile IP (PMIP) v4 or PMIPv6 tunnels. APs 104 provide wireless connectivity with wireless mobile CDs (CDs) 126(1) and 126(2) (collectively referred to as CDs 126) over wireless links graphically depicted at reference numerals 130(1), 130(2) and 130(3) (collectively referred to as wireless links 130), which may operate in accordance with any of the IEEE 802.11 protocols, for example. Client devices 126 send/receive data packets to/from router 120 over tunnels 122 between the APs 104 and the router 120. For completeness, all of tunnels 118(1)-118(3) and 122(1)-122(3) are depicted as active in FIG. 1; however, at any given time, only some of the tunnels will be active and, in some instances, no tunnel may be active, as will be described below. The router 120 may also be referred to as a Local Mobility Anchor (LMA)/router. An LMA is the home agent for a mobile node, e.g., CD, in a Proxy Mobile IPv6 (PMIPv6) domain. It is the topological anchor point for mobile node home network prefixes and manages the binding state of a mobile node. An LMA may have the functional capabilities of a home agent as defined in the Mobile IPv6 base specification (RFC 3775) along with the capabilities required for supporting the PMIPv6 protocol.

It is understood that the configuration shown in FIG. 1 is a simple example configuration and that there are, in practice, many more controllers, routers, APs and CDs in any given network environment. Furthermore, the term "AP" or wireless access point device is meant to refer to any wireless device that provides wireless connectivity in a wireless network, and is not to be limited to, for example, IEEE 802.11 APs. For example the techniques described herein are applicable to other wireless networks, such as a WiMAX™ wireless network, where devices known as base stations in WiMAX parlance perform functions similar to that of an AP in an IEEE 802.11 wireless network. Likewise, the term "controller" or "WLAN controller" is meant to refer to any control element that controls a wireless device that provides wireless connectivity in a wireless network, and includes for example, a wireless gateway device. A WiMAX wireless network is only one example of other wireless networks to which these techniques are applicable. Thus, the configuration shown in FIG. 1 is only meant to be an example for purposes of describing the techniques herein.

Controller 114 and router 120 are configured to implement what is referred to as a split "control plane" (CP)-"data plane" (DP) architecture, now described. In the control plane, controller 114 manages/controls APs 104 via an exchange of management messages (i.e., control plane messages) with the APs over CAPWAP or other Layer 2/Layer 3 tunnels 118. Therefore, management/control functions, also referred to as control plane functions, may reside primarily in controller 114. On the other hand, in the data plane, data packets (i.e., user generated traffic to/from CDs 126) are tunneled between APs 104 and router 120; hence, controller 114 may be minimally involved with the data plane in this example split CP-DP architecture.

The split CP-DP architecture advantageously enables independent scaling of the CP in controller 114 and the DP in router 120 and APs 104. A side effect, however, is that router 120 is required to handle an increase in message signaling with APs 104 when CDs 126 roam from one AP to the next because the router may need to tear-down existing IP tunnels and establish new IP tunnels with the APs to accommodate the roaming. The increase in signaling experienced by router 120 is especially acute in relatively small geographical areas that have a high concentration of APs that are clustered in groups and in which CDs roam frequently.

Accordingly, techniques are presented herein to handle roaming in the split CP-DP architecture, which reduces roaming-induced message signaling at router 120 in certain AP arrangements. To do this, the technique—referred to as "cluster roaming"—employs "AP clusters" and inter-AP tunnels established between two APs within an AP cluster to assist in routing data packets to/from CDs 126. An AP cluster is a predetermined group of two or more APs that are geographically collocated in a relatively small area, such as in a shopping mall, Internet café, and so on. In the example of FIG. 1, an AP cluster 150 includes APs 126(1) and 126(2), while AP 126(3) may or may not be part of another AP cluster (not shown). Cluster roaming essentially offloads from router 120 to controller 114 and APs 104 the signaling load that results when one of the CDs 126 roams from one AP to the next within the same AP cluster, e.g., within AP cluster 150. Controller 114 and APs 126 are configured to perform respective functions to implement cluster roaming and, to this end, controller 114 and each of APs 104 are configured with respective Cluster Roaming Control logic to perform their respective cluster roaming functions, as will be described in detail below.

Figure 2:
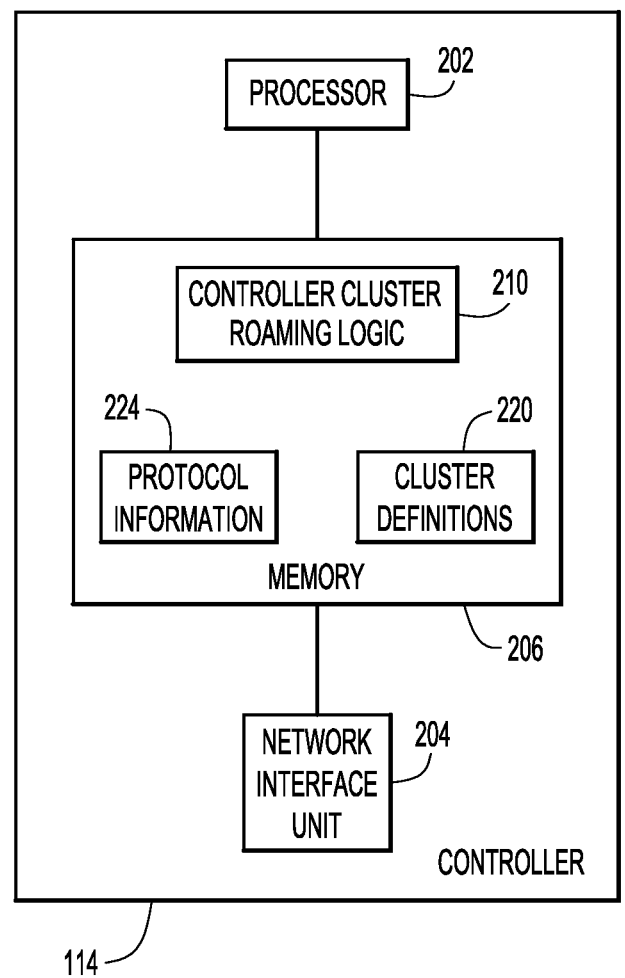
FIG. 2 is a block diagram of a network controller from FIG. 1 that is configured to support the cluster roaming techniques presented herein.

Referring now to FIG. 2, there is shown an example block diagram of controller 114, which is configured to perform cluster roaming techniques described herein. Controller 114 includes a processor 202, a network interface unit 204 and a memory 206. The processor 202 is for example, a microprocessor, a microcontroller, a digital signal processor, etc. The network interface unit 204 is a device that is configured to enable communications over a wired network according to any of a variety of networking protocols.

The memory 206 is a tangible processor readable or computer readable memory that stores or is encoded with instructions that, when executed by the processor 202, cause the processor 202 to perform functions described herein. Memory 206 may comprise read only memory (ROM), random access memory (RAM), magnetic disk storage media devices, optical storage media devices, flash memory devices, electrical, optical, or other physical/tangible memory storage devices. Thus, in general, the memory 206 may comprise one or more tangible (non-transitory) computer readable storage media (e.g., a memory device) encoded with software comprising computer executable instructions and when the software is executed (by the processor 202) it is operable to perform the operations described herein. For example, the memory 206 is encoded with instructions for Cluster Roaming logic 210. The operations performed when logic 210 is executed are described hereinafter in connection with FIG. 4-6.

While FIG. 2 shows a processing environment comprising processor 202 that executes software stored in memory 204, an alternative processing environment is a fixed data processing element, such as an application specific integrated circuit (ASIC) that is configured, through fixed hardware logic, to perform the functions of the logic 210. Yet another possible data processing environment is one involving one or more field programmable logic devices, or a combination of fixed processing elements and programmable logic devices.

The memory 206 also stores data accessed by logic 210, including predetermined cluster definitions 220 listing AP identifiers (IDs) of APs that belong to various AP clusters, each identified by a corresponding AP cluster ID. The data also includes protocol information 224 relating to, e.g., Dynamic Host Configuration Protocol (DHCP) and PMIPv4 or v6protocols used in network environment 10.

Figure 3:
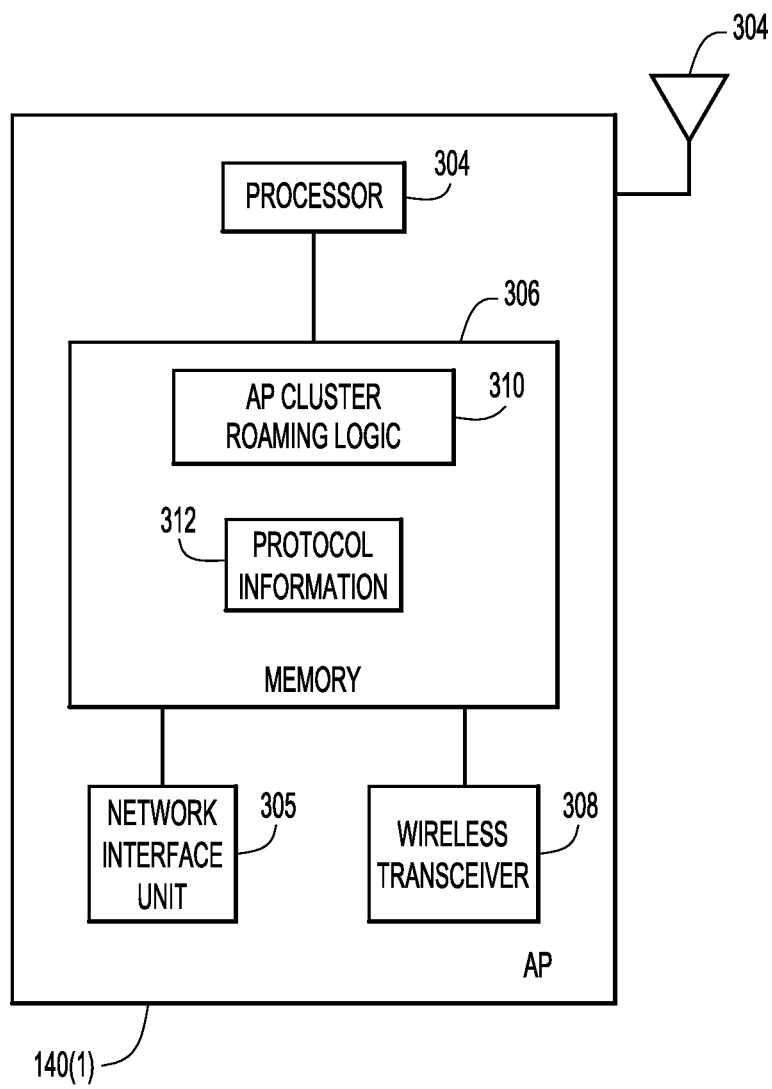
FIG. 3 is a block diagram for a wireless access point device from FIG. 1 configured to support the cluster roaming techniques.

FIG. 3 shows an example of a block diagram for an AP, such as any of APs 104(1)-104(3). An AP comprises a processor 304, a wired network interface 305 and memory 306. In addition, an AP comprises a wireless transceiver 308 that is configured to transmit wireless signals to CDs and receive wireless signals from the CDs via at least one antenna 309. Wireless transceiver 308 may also transmit wireless signals to and receive wireless signals from other APs wirelessly connected with the AP depicted in FIG. 3. The wireless transceiver 308 may comprise one or more ASICs configured to support a wireless communication standard, such as the IEEE 802.11 standards. The memory 306 stores instructions for AP Cluster Roaming logic 310. The memory 306 also stores protocol information 312 similar to protocol information 224 stored in controller 114.

Figure 4:
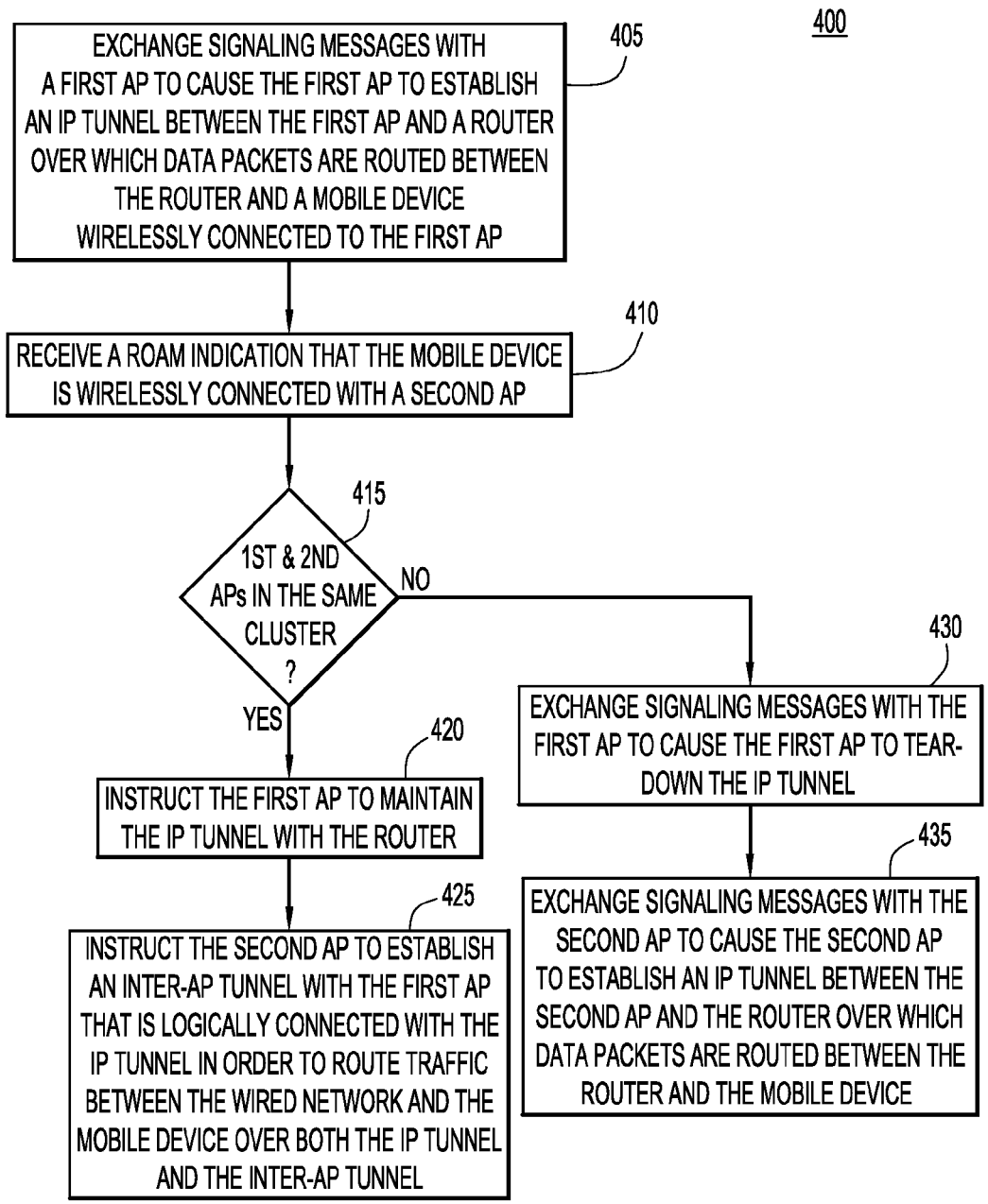
FIG. 4 is a flowchart of an example method that is performed under the control of the network controller.
Figure 5:
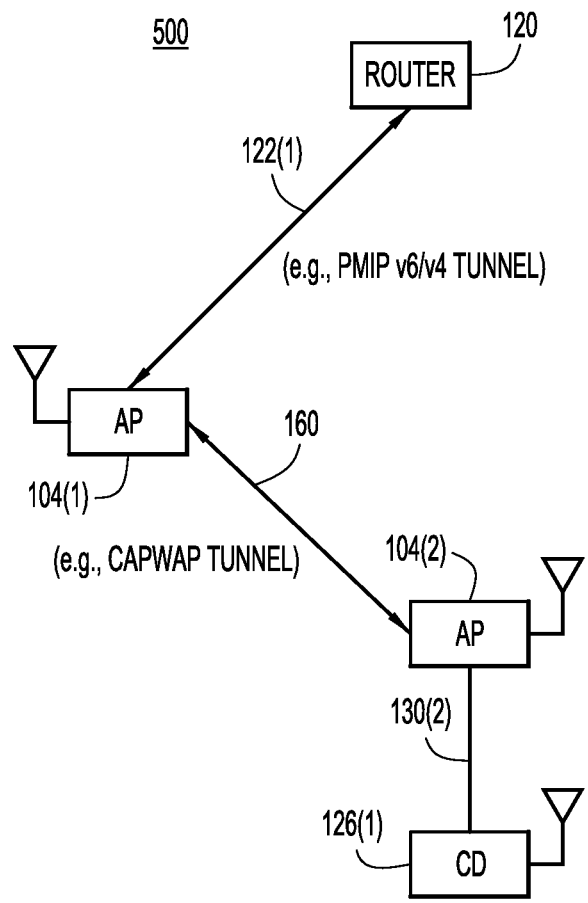
FIG. 5 is an example of an Internet Protocol (IP) tunnel arrangement for routing data packets for a CD between an AP and a router after the CD has roamed between APs in the same AP cluster.

Turning to FIG. 4, there is shown a flowchart of an example method 400 of cluster roaming performed in network environment 100 in an example in which CD 126(1) roams from AP 104(1) to 104(2). FIG. 5 is also referred to herein in connection with the description of FIG. 4. Method 400 is described from the perspective of controller 114, i.e., the operations depicted in FIG. 4 are performed by the controller. FIG. 4 is described also with continued reference to network environment 100 in FIG. 1.

Initially, CD 126(1) wirelessly connects with AP 104(1) over wireless link 130(1) and requests access to communication network 110. AP 104(1) forwards the access request to controller 114.

At 405, controller 114 receives the initial access request and, in response, exchanges signaling messages with AP 104(1) to cause the AP to establish IP tunnel 122(1) (e.g., a PMIPv6 tunnel) between the AP and router 120 over which data packets are routed between the router and CD 126(1). In other words, CD 126(1) may exchange data packets with a peer device connected to communication network 110 via AP 104(1), IP tunnel 122(1), and router 120.

In the example where the IP tunnel is a PMIPv6 tunnel, router 120 functions as a Local Mobility Anchor (LMA) because the router acts as a home agent for CD 126(1) in the PMIPv6 domain, as explained above. The PMIPv6 domain is the network where the mobility management of CD 126(1) is handled using the PMIPv6 protocol. Thus, LMA/router 120 is the topological anchor point for CD 126(1)'s home network prefix and the router 120 is the entity that manages the CDs binding state.

CD 126(1) moves along a trajectory 140 (depicted in FIG. 1) and, as a result, roams from AP 104(1) to AP 104(2), meaning that the CD becomes wirelessly connected with AP 104(2) over wireless link 130(2). CD 126(1) again requests access to communication network 120, but this time through AP 104(2). AP 104(2) forwards the second access request to controller 114.

At 410, controller 114 receives the second access request, which indicates to the controller that CD 126(1) has roamed from AP 104(1) to AP 104(2).

At 415, responsive to the roam indication, controller 114 consults its AP cluster definitions to determine whether APs 104(1) and 104(2) are in the same AP cluster, i.e., whether CD 126(1) has roamed between APs in the same cluster or, alternatively, roamed from one AP cluster to an AP outside of the AP cluster (e.g., into another AP cluster). In the example of FIG. 1, the AP definitions indicate that APs 104(1) and 104(2) both reside in AP cluster 105. Thus, controller 114 determines that an intra-cluster roam has occurred and flow proceeds to 420-425.

At 420, controller 114 instructs AP 104(1) to maintain IP tunnel 122(1) with router 120, i.e., to ensure that the IP tunnel remains in place, despite the roam to AP 104(2).

At 425, controller 114 instructs AP 104(2) to establish inter-AP tunnel 160 between these APs (i.e., between APs 104(1) and 104(2)) that is logically joined to existing IP tunnel 122(1), meaning that the existing IP tunnel and the inter-AP tunnel form a single composite tunnel over which data packets to/from CD 126 may be routed from/to router 120. In other words, data packets between communication network 110 and CD 126 are routed over both IP tunnel 122(1) and inter-AP tunnel 160. In an example, inter-AP tunnel 160 is a CAPWAP tunnel, although other types of inter-AP tunnels suitable for transporting data packets may be used. A logical join between the tunnels may be based on an association of each of the tunnels with one or more of a same device identifier for the CD, such as an IP address allocated to the CD, a media access control (MAC) address of the CD, an IP address of the router, and an IP address of a peer device in the wired network to which the CD is exchanging the data packets over the joined tunnels.

As shown in FIG. 5, there is a cluster roaming tunnel arrangement 500 for routing data packets between CD 126(1) and router 120 in network environment 100 after operation 425 is complete.

Returning to 420 in FIG. 4, if controller 114 had determined at 420 that APs 104(1) and 104(2) were not in the same AP cluster, then a roam to an AP outside of the AP cluster has occurred and flow proceeds to 430 and 435. In this case, the roam may represent an inter-cluster roam in which AP 104(2) is in a different cluster from AP 104(1).

At 430, controller 114 exchanges signaling messages with AP 104(1) to cause the AP to tear-down IP tunnel 122(1).

At 435, controller 114 exchanges signaling messages with AP 104(2) to cause the AP to establish IP tunnel 122(2) between the AP and router 120 over which data packets are routed between the router and CD 126.

As is evident from the description of method 400 above, the handling of a CD's intra-cluster roam (i.e., a roam between two APs in the same AP cluster) avoids the roaming-induced signaling associated with both tearing-down and then establishing IP tunnels (see operations 430 and 435) and, therefore, reduces the signaling load on router 120. The intra-cluster roam uses the CAPWAP inter-AP tunnel in addition to the originally established PMIPv6 tunnel between the anchor AP (i.e., first AP to which the CD first connected) and the router. On the other hand, a roam outside of the AP cluster (e.g., an inter-cluster roam) requires a new PMIPv6 tunnel between the "roamed-to" AP and the router. The cluster roaming techniques described herein handle both intra-cluster and inter-cluster roams and thus forms a hierarchical mobility technique having a higher level mobility associated with the inter-cluster roam and a lower level of mobility associated with the intra-cluster roam. Such hierarchical mobility employs hybrid tunnels, e.g., the CAPWAP tunnel for the lower level mobility and the PMIPv6 tunnel for the higher level mobility.

Figure 6B:
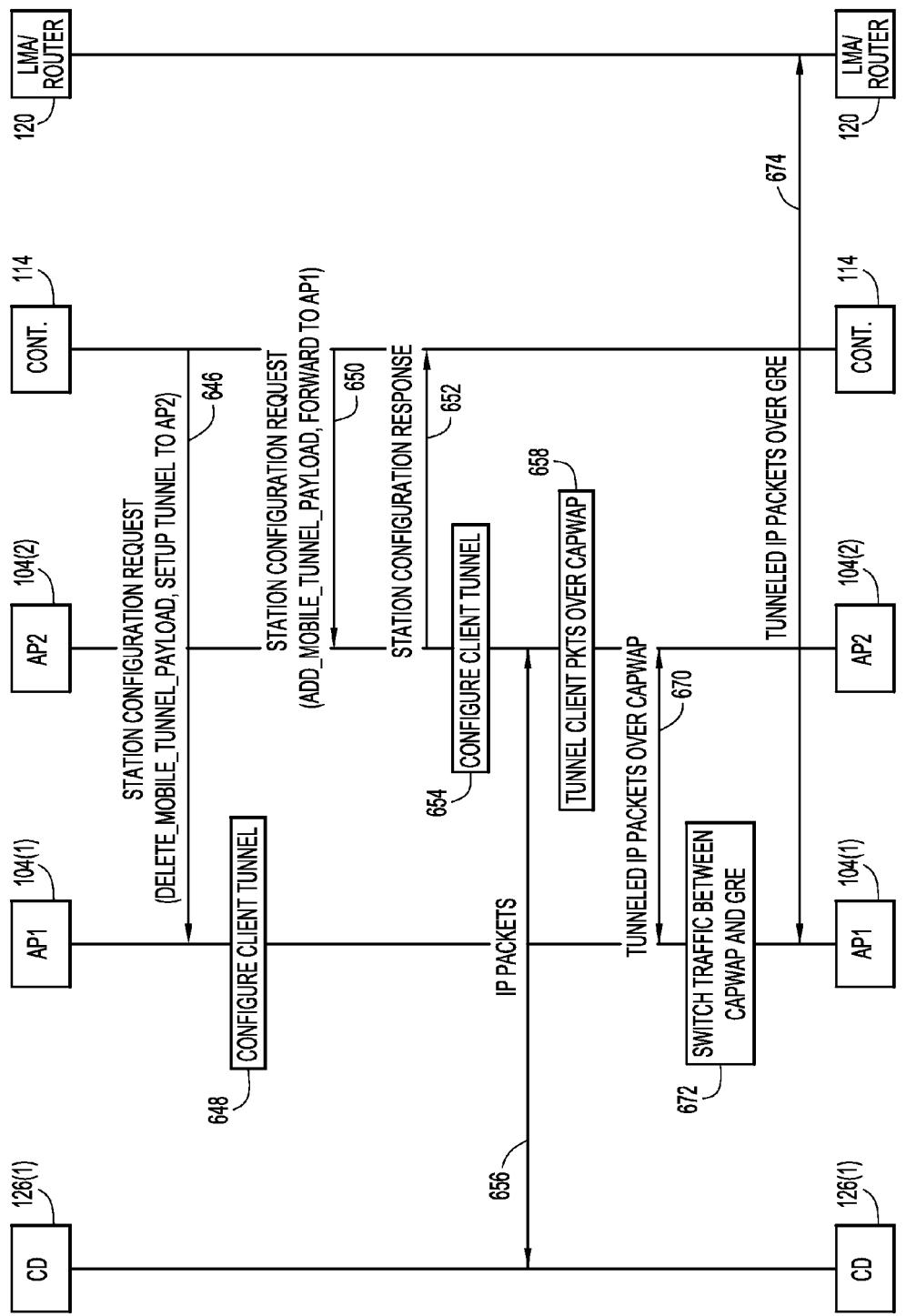

Turning to FIGS. 6A and 6B, there is depicted a detailed ladder diagram 600 showing in more detail the transactions between the various elements of network environment 100 during the intra-cluster roam described above in connection with method 400, such as when CD 126(1) roams from AP 104(1) to AP 104(2). AP1 and AP2 in FIGS. 6A and 6B (and in the description below) correspond to APs 104(1) and 104(2) in FIG. 4, respectively. The transactions described below employ exchanges of messages in accordance with DHCP and PMIPv6 as appropriate; however, other similar protocols may be used.

Transactions 602-632 result in an IP tunnel (e.g., PMIPv6 tunnel) between AP1 and router 120 and are described first.

At 602 and 604, CD 126(1) and AP1, and AP1 and controller 114, exchange association and authentication messages with each other when the CD requests network access through the AP.

At 606, controller 114 determines system information necessary to establish an IP tunnel between router 120 and CD 126(1), including the appropriate type of IP tunnel (e.g., PMIPv6), the address of the LMA/router, an access control list (ACL), etc.

At 608, controller 114 sends a Station Configuration Request to AP1. The Station Configuration Request includes an Add_Mobile_Tunnel_Payload instruction and the LMA/router address determined at 606.

In response to the Station Configuration Request, at 610 AP1 sends a Station Configuration Response to controller 114, and establishes both wireless-side and network-side contexts for CD 126(1). The wireless-side context maintains wireless link and related state information so that AP1 may maintain its wireless connection with the CD, while the network-side context maintains similar information that enables AP1 to direct data packets appropriately to/from the CD from/to router 120.

At 616, AP1 sends a Proxy Binding Update (PBU) message to router 120.

At 618, router 120 sends a Proxy Binding Acknowledge (PBA) message to AP1 in response to the PBU message. The PBU message provides AP1 with an IP address for CD 126(1).

At 619, CD 126(1) and AP1 exchange DHCP messages to allocate to the CD the IP address provided from router 120.

At 620, AP1 sets-up PMIP tunnel attributes for an IP tunnel between the AP and router 120 in response to the exchange of PBU/PBA messages at 616 and 618.

At 622, AP1 sends to controller 114 a Configuration Update Request, including a Mobile_PMIPv6_Payload, an IP address, etc. The Configuration Update Request moves the CD 126(1) to a "Run State" in the controller 114 at 624.

At 626, controller 114 sends a Configuration Update Response (CUR) to AP1 responsive to the Configuration Update Request at 622.

At 628, in response to the Configuration Update Request, AP1 enables an IP tunnel (e.g., a PMIPv6 tunnel) between the AP1 and router 120. The IP tunnel may be encapsulated in a Generic Routing Encapsulation (GRE) protocol.

At 630 and 632, data packets (e.g., IP packets) are routed between CD 126(1) and router 120 over the PMIPv6 tunnel (as encapsulated in GRE, for example) as depicted at 632.

At 634, CD 126(1) roams from AP1 to AP2.

Transactions 642-654 described below maintain the IP tunnel between AP1 and router 120 (despite the roam to AP2) and establish an inter-AP tunnel between AP1 and AP2 that is logically connected with the IP tunnel because AP1 and AP2 are in the same AP cluster (in this example).

At 642 and 644, CD 126(1) and AP2, and AP2 and controller 114, exchange association and authentication messages with each other when the CD requests network access through the AP. This exchange informs controller 114 that CD 126(1) has roamed.

At 646, in response to messages received at 644, controller 114 determines whether AP1 is in the same AP cluster as AP2. Assuming AP1 and AP2 are in the same AP cluster, controller 114 sends to AP1 a Station Configuration Request, including a Delete_Mobile_Tunnel_Payload command, and a setup tunnel to AP2 command. This message causes AP1 to:
  i. Delete the wireless-side context for CD 126(1) because the CD has wirelessly connected with (associated to) AP2;
  ii. maintain the IP tunnel with router 120 and maintain the network-side context related to the CD so that AP1 is able to route data packets between itself and the router; and
  iii. at 648, establish an inter-AP tunnel (e.g., a CAPWAP tunnel) with AP2.

At 650, controller 114 sends to AP2 a Station Configuration Request, including an Add_Mobile_Tunnel_Payload command, and a forward to AP1 command. This message causes AP2 to:
  i. establish a wireless-side context for CD 126(1);
  ii. at 652, send to controller 114 a Station Configuration Response; and
  iii. at 654, complete the establishment of the inter-AP tunnel (e.g. CAPWAP tunnel) with AP1.

After 654, the initial IP tunnel between AP1 and router 120 has been maintained, while an inter-AP tunnel between AP1 and AP2 has been established. The various messages at 646 and 650 ensure that the IP tunnel and the inter-AP tunnel are logically joined so that the two tunnels act as a composite tunnel through which data packets are effectively routed, seamlessly, between CD 126(2)/AP2 and router 120.

For data packets (e.g., IP packets) flowing in a direction from CD 126(1) to router 120, the following flow occurs:
  i. at 656, the data packets are wirelessly transmitted from the CD to AP2 over wireless link 130(2);
  ii. at 658, AP2 directs/switches the data packets received from the CD to the CAPWAP tunnel between AP1 and AP2;
  iii. at 670, the data packets are routed from AP2 to AP1 over the CAPWAP tunnel;
  iv. at 672, AP1 directs/switches the data packets received from the CAPWAP tunnel to the PMIPv6 tunnel between AP1 and router 120; and
  v. at 674, the data packets are routed from AP1 to router 120 over the PMIPv6 tunnel.

For data packets flowing in a direction from router 120 to CD 126(1):
  i. at 674, the data packets are routed from router 120 to AP1 over the PMIPv6 tunnel;
  ii. at 672, AP1 directs/switches the data packets received from the PMIPv6 tunnel to the CAPWAP tunnel between AP1 and AP2;
  iii. at 670, the data packets are routed from AP1 to AP2 over the CAPWAP tunnel;
  iv. at 658, AP2 directs/switches the data packets received from the CAPWAP tunnel to the wireless link 130(2); and
  v. at 656, the data packets are wireless transmitted from AP2 to CD 126(1) over the wireless link.

With reference to FIG. 7, there is an illustration of example AP cluster definitions 700 stored in memory 206 of controller 114. AP cluster definitions 700 map AP cluster identifiers (IDs) to corresponding AP IDs that belong to the clusters. For example, AP Cluster 1 includes APs 10, 20, and 30, and AP Cluster 2 includes APs 20, 40, and 60.

In summary, in one form, a method is provided, comprising: at a controller configured to control access points (APs) in a wireless network of APs: exchanging signaling messages with a first AP to cause the first AP to establish an Internet Protocol (IP) tunnel between the first AP and a router connected with a wired network and over which data packets are routed between the wired network and a client device wirelessly connected to the first AP; receiving a roam indication that the client device is wirelessly connected with a second AP; in response to the roam indication, instructing the first AP to maintain the IP tunnel with the router; and instructing the second AP to establish an inter-AP tunnel with the first AP in order to route traffic between the wired network and the client device over both the IP tunnel and the inter-AP tunnel.

In still another form, an apparatus is provided, comprising: network interface unit configured to send and receive messages over a wired network; and a processor configured to control access points (APs) in a wireless network of APs, and further configured to: exchange signaling messages with a first AP to cause the first AP to establish an Internet Protocol (IP) tunnel between the first AP and a router connected with a wired network and over which data packets are routed between the wired network and a client device wirelessly connected to the first AP; receive a roam indication that the client device is wirelessly connected with a second AP; in response to the roam indication, instruct the first AP to maintain the IP tunnel with the router; and instruct the second AP to establish an inter-AP tunnel with the first AP in order to route traffic between the wired network and the client device over both the IP tunnel and the inter-AP tunnel.

In still another form, a tangible processor readable medium is provided for storing instructions that, when executed by a processor, cause the processor to: exchange signaling messages with a first access point (AP) among multiple access points (APs) in a wireless network of APs to cause the first AP to establish an Internet Protocol (IP) tunnel between the first AP and a router connected with a wired network and over which data packets are routed between the wired network and a client device wirelessly connected to the first AP; receive a roam indication that the client device is wirelessly connected with a second AP; in response to the roam indication, instruct the first AP to maintain the IP tunnel with the router; and instruct the second AP to establish an inter-AP tunnel with the first AP in order to route traffic between the wired network and the client device over both the IP tunnel and the inter-AP tunnel.

Although the apparatus, system, method, and computer program product are illustrated and described herein as embodied in one or more specific examples, it is nevertheless not intended to be limited to the details shown, since various modifications and structural changes may be made therein without departing from the scope of the apparatus, system, method, and computer program product and within the scope and range of equivalents of the claims. Accordingly, it is appropriate that the appended claims be construed broadly and in a manner consistent with the scope of the apparatus, system, method, and computer program product, as set forth in the following claims.

What is claimed is:

1. A method comprising:
   at a network controller configured to control access points (APs) in a wireless network of APs, and to offload from a router connected with the wired network roam signalling with the APs:
   storing AP cluster definitions each to map a respective cluster identifier to multiple AP identifiers of APs within the identified cluster;
   instructing a first AP to cause the first AP to establish an Internet Protocol (IP) tunnel between the first AP and the router and over which data packets are routed between the wired network and a client device wirelessly connected to the first AP;
   in response to receiving a roam indication that the client device is wirelessly connected with a second AP, determining whether the first and second APs are both within a a same cluster of APs based on the stored AP cluster definitions;
   if it is determined that the first and second APs are both within a same cluster of APs, instructing the first AP to maintain the IP tunnel with the router, and instructing the second AP to establish an inter-AP tunnel with the first AP in order to route traffic between the wired network and the client device over both the IP tunnel and the inter-AP tunnel; and
   if it is determined that the first and second APs are not both within a same cluster of APs, instructing the first AP to tear-down the IP tunnel between the first AP and the router, and instructing the second AP to establish an IP tunnel between the second AP and the router over which data packets are routed between the wired network and the client device.

2. The method of claim 1, wherein the instructing the first AP includes sending a first signaling message to the first AP to cause the first AP to:
   maintain the IP tunnel with the router;
   delete a context for the client device containing information about how the client device is wirelessly connected with the first AP; and
   establish the inter-AP tunnel with the second AP.

3. The method of claim 2, wherein the instructing the second AP includes sending a second signaling message to the second AP to cause the second AP to:
   establish the inter-AP tunnel with the first AP;
   forward data packets from the client device to the inter-AP tunnel; and
   forward data packets received from the client device to the inter-AP tunnel, forward data packets received from the inter-AP tunnel to the client device.

4. The method of claim 1, further comprising, at the controller:
   establishing first and second respective Control And Provisioning of Wireless Access Points (CAPWAP) tunnels between the first and second APs and the controller,
   wherein the instructing the first AP and the instructing the second AP respectively use the first and second CAPWAP tunnels, and
   wherein the inter-AP tunnel is established as a third CAPWAP tunnel.

5. The method of claim 4, wherein the exchanging messages includes exchanging Proxy Mobile IP (PMIP) signaling messages to establish the IP tunnel as a PMIP tunnel.

6. The method of claim 1, further comprising, at the controller:
   receiving a first network access request from the first AP on behalf of the client device when the client device initially connects to the first AP,
   wherein the receiving a roam indication includes receiving a second network access request from the second AP on behalf of the client device when the client device roams from the first AP and initially connects to the second AP.

7. An apparatus comprising:
   network interface unit configured to send and receive messages over a wired network; and
   a processor of a network controller configured to control access points (APs) in a wireless network of APs so as to offload from a router connected with a wired network roam signalling with the APs, and further configured to:
   store AP cluster definitions each to map a respective cluster identifier to multiple AP identifiers of APs within the identified cluster;
   instruct a first AP to cause the first AP to establish an Internet Protocol (IP) tunnel between the first AP and the router and over which data packets are routed between the wired network and a client device wirelessly connected to the first AP;
   in response to receipt of a roam indication that the client device is wirelessly connected with a second AP, determine whether the first and second APs are both within a a same cluster of APs based on the stored AP cluster definitions;
   if it is determined that the first and second APs are both within a same cluster of APs, instruct the first AP to maintain the IP tunnel with the router, and instruct the second AP to establish an inter-AP tunnel with the first AP in order to route traffic between the wired network and the client device over both the IP tunnel and the inter-AP tunnel; and
   if it is determined that the first and second APs are not both within a same cluster of APs, instruct the first AP to tear-down the IP tunnel between the first AP and the router, and instruct the second AP to establish an IP tunnel between the second AP and the router over which data packets are routed between the wired network and the client device.

8. The apparatus of claim 7, wherein the processor is configured to instruct the first AP by sending a first signaling message to the first AP to cause the first AP to:
   maintain the IP tunnel with the router;

delete a context for the client device containing information about how the client device is wirelessly connected with the first AP; and establish the inter-AP tunnel with the second AP.

9. The apparatus of claim 8, wherein the processor is configured to instruct the second AP by sending a second signaling message to the second AP to cause the second AP to:

establish the inter-AP tunnel with the first AP;

forward data packets from the client device to the inter-AP tunnel; and forward data packets received from the client device to the inter-AP tunnel, forward data packets received from the inter-AP tunnel to the client device.

10. The apparatus of claim 7, wherein the processor is further configured to:

establish first and second respective Control And Provisioning of Wireless Access Points (CAPWAP) tunnels between the first and second APs and the controller, wherein processor is configured to instruct the first AP and the instruct the second AP respectively by using the first and second CAPWAP tunnels, and wherein the inter-AP tunnel is established as a third CAPWAP tunnel.

11. The apparatus of claim 10, wherein the processor is further configured to exchange the messages by exchanging Proxy Mobile IP (PMIP) signaling messages to establish the IP tunnel as a PMIP tunnel.

12. The apparatus of claim 7, wherein the processor is further configured to:

receive a first network access request from the first AP on behalf of the client device when the client device initially connects to the first AP, wherein the processor is configured to receive the roam indication by receiving a second network access request from the second AP on behalf of the client device when the client device roams from the first AP and initially connects to the second AP.

13. A non-transitory processor readable medium storing instructions that, when executed by a processor in a network controller to control access points (APs) in a wireless network of APs and so as to offload from a router connected with a wired network roam signalling with the APs, cause the processor to:

store AP cluster definitions each to map a respective cluster identifier to multiple AP identifiers of APs within the identified cluster;

instruct a first AP among the APs in the wireless network of APs to establish an Internet Protocol (IP) tunnel between the first AP and the router and over which data packets are routed between the wired network and a client device wirelessly connected to the first AP;

in response to receipt of a roam indication that the client device is wirelessly connected with a second AP, determine whether the first and second APs are both within a a same cluster of APs based on the stored AP cluster definitions;

if it is determined that the first and second APs are both within a same cluster of APs, instruct the first AP to maintain the IP tunnel with the router, and instruct the second AP to establish an inter-AP tunnel with the first AP in order to route traffic between the wired network and the client device over both the IP tunnel and the inter-AP tunnel; and if it is determined that the first and second APs are not both within a same cluster of APs, instruct the first AP to tear-down the IP tunnel between the first AP and the router, and instruct the second AP to establish an IP tunnel between the second AP and the router over which data packets are routed between the wired network and the client device.

14. The processor readable medium of claim 13, wherein the instructions to cause the processor to instruct the first AP include instructions to cause the processor to send a first signaling message to the first AP to cause the first AP to:

maintain the IP tunnel with the router;

delete a context for the client device containing information about how the client device is wirelessly connected with the first AP; and establish the inter-AP tunnel with the second AP.

15. The processor readable medium of claim 14, wherein the instructions to cause the processor to instruct the second AP include instructions to cause the processor to send a second signaling message to the second AP to cause the second AP to:

establish the inter-AP tunnel with the first AP;

forward data packets from the client device to the inter-AP tunnel; and forward data packets received from the client device to the inter-AP tunnel, forward data packets received from the inter-AP tunnel to the client device.

16. The processor readable medium of claim 13, further including instructions to cause the processor to:

establish first and second respective Control And Provisioning of Wireless Access Points (CAPWAP) tunnels between the first and second APs and the controller, wherein the instructions to cause the processor to instruct the first AP and instruct the second AP respectively use the first and second CAPWAP tunnels, and wherein the inter-AP tunnel is established as a third CAPWAP tunnel.

17. The processor readable medium of claim 16, wherein the exchange of messages includes an exchange of Proxy Mobile IP (PMIP) signaling messages to establish the IP tunnel as a PMIP tunnel.

18. The processor readable medium of claim 13, further including instructions to cause the processor to:

receive a first network access request from the first AP on behalf of the client device when the client device initially connects to the first AP, wherein the instructions to cause the processor to receive a roam indication include instructions to cause the processor to receive a second network access request from the second AP on behalf of the client device when the client device roams from the first AP and initially connects to the second AP.

* * * * *